United States Patent [19]

Shaw

[11] Patent Number: 5,714,550
[45] Date of Patent: Feb. 3, 1998

[54] FLAME RETARDANT POLYAMIDE-POLYPHENYLENE ETHER COMPOSITIONS

[75] Inventor: Jeremy Paul Shaw, Jankenberg, Netherlands

[73] Assignee: General Electric Company, Pittsfield, Mass.

[21] Appl. No.: 735,484

[22] Filed: Oct. 23, 1996

Related U.S. Application Data

[63] Continuation of Ser. No. 541,364, Oct. 10, 1995, abandoned.

[51] Int. Cl.$^6$ .............................. C08K 3/38; C08L 71/03; C08L 77/00
[52] U.S. Cl. .................... 525/393; 525/66; 525/92 B; 525/397; 524/188; 524/265; 524/405
[58] Field of Search ....................................... 525/66, 92 B, 525/393, 397; 524/188, 265, 405

[56] References Cited

U.S. PATENT DOCUMENTS

| | | |
|---|---|---|
| 3,063,872 | 11/1962 | Boldebuck . |
| 3,379,792 | 4/1968 | Finholt . |
| 3,737,479 | 6/1973 | Haaf . |
| 3,960,985 | 6/1976 | Cooper . |
| 4,315,086 | 2/1982 | Ueno et al. . |
| 4,338,421 | 7/1982 | Maruyama et al. . |
| 4,446,090 | 5/1984 | Lovgren et al. . |
| 4,487,858 | 12/1984 | Lovgren et al. . |
| 4,552,912 | 11/1985 | Williams . |
| 4,600,741 | 7/1986 | Aycock et al. . |
| 4,642,358 | 2/1987 | Aycock et al. . |
| 4,654,405 | 3/1987 | Jalbert . |
| 4,659,760 | 4/1987 | Van der Meer . |
| 4,728,693 | 3/1988 | Droscher et al. . |
| 4,737,938 | 4/1988 | Grant et al. . |
| 4,743,651 | 5/1988 | Shibuya et al. . |
| 4,745,157 | 5/1988 | Yates, III et al. . |
| 4,749,737 | 6/1988 | Van der Meer . |
| 4,755,566 | 7/1988 | Yates, III et al. . |
| 4,760,115 | 7/1988 | Droescher et al. . |
| 4,772,664 | 9/1988 | Ueda, et al. . |
| 4,792,586 | 12/1988 | Han . |
| 4,798,865 | 1/1989 | Grant et al. . |
| 4,822,836 | 4/1989 | Wroczynski . |
| 4,822,837 | 4/1989 | van der Meer . |
| 4,824,915 | 4/1989 | Aycock et al. . |
| 4,826,933 | 5/1989 | Grant et al. . |
| 4,839,425 | 6/1989 | Mawatari et al. . |
| 4,857,575 | 8/1989 | van der Meer . |
| 4,859,739 | 8/1989 | Yates, III et al. . |
| 4,866,114 | 9/1989 | Taubitz et al. . |
| 4,866,144 | 9/1989 | Best et al. . |
| 4,871,795 | 10/1989 | Pawar . |
| 4,873,286 | 10/1989 | Gallucci et al. . |
| 4,874,810 | 10/1989 | Lee, Jr. et al. . |
| 4,877,847 | 10/1989 | Masu et al. . |
| 4,885,334 | 12/1989 | Mayumi et al. . |
| 4,888,397 | 12/1989 | Van der Meer et al. . |
| 4,889,889 | 12/1989 | Yates, III . |
| 4,923,924 | 5/1990 | Grant . |
| 4,929,675 | 5/1990 | Abe et al. . |
| 4,957,965 | 9/1990 | Taubitz et al. . |
| 4,960,825 | 10/1990 | Van der Meer . |
| 4,981,920 | 1/1991 | Terashima et al. . |
| 4,990,564 | 2/1991 | Taubitz et al. . |
| 5,000,897 | 3/1991 | Chambers . |
| 5,001,181 | 3/1991 | Tagaki et al. . |
| 5,017,652 | 5/1991 | Abe et al. . |
| 5,017,663 | 5/1991 | Mizuno et al. . |
| 5,019,626 | 5/1991 | Taubitz et al. . |
| 5,026,787 | 6/1991 | Tagaki et al. . |
| 5,032,635 | 7/1991 | Avakian et al. . |
| 5,039,746 | 8/1991 | Nugebauer et al. . |
| 5,041,504 | 8/1991 | Brown et al. . |
| 5,053,458 | 10/1991 | Taubitz et al. . |
| 5,055,494 | 10/1991 | van der Meer . |
| 5,061,746 | 10/1991 | Gallucci et al. . |
| 5,069,818 | 12/1991 | Aycock et al. . |
| 5,070,151 | 12/1991 | Mizuno et al. . |
| 5,071,894 | 12/1991 | Weil et al. ................... 524/492 |
| 5,073,596 | 12/1991 | Inoue et al. . |
| 5,073,620 | 12/1991 | Sanada et al. . |
| 5,084,523 | 1/1992 | Neugebauer et al. . |

(List continued on next page.)

FOREIGN PATENT DOCUMENTS

| | | |
|---|---|---|
| 0 147 874 B1 | 10/1984 | European Pat. Off. . |
| 0129825 | 1/1985 | European Pat. Off. . |
| 0182163 | 5/1986 | European Pat. Off. . |
| 0 221 341 B1 | 9/1986 | European Pat. Off. . |
| 0 222 129 B1 | 9/1986 | European Pat. Off. . |
| 0 234 063 B1 | 12/1986 | European Pat. Off. . |
| 0-237-187-A1 | 2/1987 | European Pat. Off. . |
| 0-292-153-A2 | 5/1988 | European Pat. Off. . |
| 0-362-439-A1 | 8/1988 | European Pat. Off. . |
| 0-369-169-A1 | 10/1989 | European Pat. Off. . |
| 0-381-390-A2 | 1/1990 | European Pat. Off. . |
| 0-436-136-A1 | 12/1990 | European Pat. Off. . |
| 0-451-563-A2 | 3/1991 | European Pat. Off. . |
| 0-506-386-A2 | 3/1992 | European Pat. Off. . |
| 0-516-150-A1 | 5/1992 | European Pat. Off. . |
| 0-523-368-A1 | 6/1992 | European Pat. Off. . |
| 0-528-581-A1 | 8/1992 | European Pat. Off. . |
| 0-491-187-A1 | 11/1992 | European Pat. Off. . |
| 0-549-268-A2 | 12/1992 | European Pat. Off. . |
| 0-550-06-A2 | 12/1992 | European Pat. Off. . |
| 0-559-485-A1 | 3/1993 | European Pat. Off. . |
| 0543462-A1 | 5/1993 | European Pat. Off. . |
| 4-39354 | 2/1992 | Japan . |
| 4-88058 | 3/1992 | Japan . |
| 4-198354 | 7/1992 | Japan . |
| 4-202256 | 7/1992 | Japan . |
| 070681 | 3/1993 | Japan ................... 524/405 |
| 2035337 | 6/1980 | United Kingdom . |
| WO 88/06167 | 8/1988 | WIPO . |
| WO 93/13251 | 7/1993 | WIPO . |

OTHER PUBLICATIONS

207152K, May 1975, Chemical Abstracts CS-A-157841

*Primary Examiner*—David Buttner

[57] ABSTRACT

The invention is directed to a polymer composition comprising:

a) a blend comprising at least one polyamide and at least one polyphenylene ether;

b) at least one polymeric siloxane compound; and c) at least one boron compound.

17 Claims, No Drawings

U.S. PATENT DOCUMENTS

| | | | |
|---|---|---|---|
| 5,086,105 | 2/1992 | Abe et al. | |
| 5,091,473 | 2/1992 | Arashiro et al. | |
| 5,095,060 | 3/1992 | Haaf | 525/397 |
| 5,096,979 | 3/1992 | Brown et al. | |
| 5,112,907 | 5/1992 | Nishio et al. | |
| 5,115,010 | 5/1992 | Sakai et al. | |
| 5,115,044 | 5/1992 | Neugebauer | |
| 5,120,800 | 6/1992 | Tsukahara et al. | |
| 5,120,801 | 6/1992 | Chambers | |
| 5,122,575 | 6/1992 | White et al. | |
| 5,124,391 | 6/1992 | Muehlbach et al. | |
| 5,134,196 | 7/1992 | Van der Meer | |
| 5,145,904 | 9/1992 | Muehlbach et al. | |
| 5,147,942 | 9/1992 | Abe et al. | |
| 5,153,266 | 10/1992 | Muehlbach et al. | |
| 5,159,008 | 10/1992 | Nishida et al. | |
| 5,159,018 | 10/1992 | Nishio et al. | |
| 5,159,075 | 10/1992 | Phanstiel et al. | |
| 5,162,433 | 11/1992 | Nishio et al. | |
| 5,162,440 | 11/1992 | Akkepeddi et al. | |
| 5,162,447 | 11/1992 | Abe et al. | |
| 5,166,237 | 11/1992 | Abe et al. | |
| 5,175,211 | 12/1992 | Sanada et al. | |
| 5,182,336 | 1/1993 | Abe et al. | |
| 5,210,125 | 5/1993 | Pernice et al. | |
| 5,212,256 | 5/1993 | Mizuno et al. | |
| 5,219,940 | 6/1993 | Nakano | 525/133 |
| 5,225,270 | 7/1993 | Bhoori et al. | |
| 5,237,002 | 8/1993 | Nishio et al. | |
| 5,244,973 | 9/1993 | Sakazume et al. | |
| 5,248,728 | 9/1993 | Lee, Jr. | |
| 5,262,478 | 11/1993 | Nishio et al. | |
| 5,266,673 | 11/1993 | Tsukahara et al. | |
| 5,280,085 | 1/1994 | Rock et al. | 525/393 |
| 5,288,786 | 2/1994 | Nishio et al. | |
| 5,296,533 | 3/1994 | Nagaoka et al. | |
| 5,310,821 | 5/1994 | Kodaira et al. | |
| 5,331,060 | 7/1994 | Aycock et al. | |
| 5,336,732 | 8/1994 | Samuels | |
| 5,357,003 | 10/1994 | Smits et al. | 525/393 |
| 5,378,750 | 1/1995 | Sayed et al. | |

FLAME RETARDANT POLYAMIDE-POLYPHENYLENE ETHER COMPOSITIONS

This is a continuation of application Ser. No. 08/541,364 filed on Oct. 10, 1995 now abandoned.

BACKGROUND OF THE INVENTION

1. Field of the Invention

This invention relates to novel polyamide-polyphenylene ether compositions.

Polymer blends which contain polyamide and polyphenylene ethers (PPE) constitute an invaluable class of engineering thermoplastic resins. Resins of polyphenylene ethers are characterized by a unique combination of chemical, physical and electrical properties. For instance, they are resistant to many solvents and generally display high impact strengths. As a result of this unique combination of properties, resins of polyphenylene ethers are suitable for a broad range of commercial applications.

Efforts have been made to prepare polymer blends which, while retaining their characteristic hydrolyric stability, dimensional stability and dielectric properties, have higher heat deflection temperatures. Particularly, there is a demand for immiscible blends, like polyamide blends, which possess increased heat deflection properties since they are, for instance, conventionally used in parts exposed to high temperatures in the automotive industry.

While thermoplastic resins and blends possess the above-described advantageous properties, they, like many other organic polymeric materials, are particularly desired when they possess flame retardant properties.

It is of increasing interest to prepare thermoplastic resins and blends prepared therefrom that are fire resistant. Such preparation conventionally employs adding flame retardant additives to the polymer/blend. However, blends comprising said flame retardant additives are invariably environmentally unfriendly.

In addition thereto, the inclusion of fire retardant additives usually unfluences the mechanical properties (impact resistance; heat resistance) negatively.

The instant invention, therefore, is directed to novel polymer compositions that display superior flame retardant properties.

2. Description of the Related Art

Efforts have been made to prepare polyamide-PPE compositions that possess flame retardant properties. In U.S. Pat. No. 4,866,144, self-extinguishing theroplastic polyphenylene ether/polyamide molding materials are disclosed. Said materials comprise triazine compounds such as cyanuric acid, cyanuric acid derivatives and mixtures thereof and preferably melamine and/or melamine cyanurate as flame proofing agents.

Other investigators have focused their attention on polyamide blends in order to improve flame retardancy. European Patents 0436136 and 0129825 describe blends of polyphenylene ethers and polyamides comprising phosphorus containing compounds in order to enhance flame retardant properties.

Still others, such as those described in European Patent 0369169, have revealed polymer compositions comprising polysiloxanes, polyamides and polyphenylene ethers having flame retardant properties.

The instant invention is based on the observations that polyamide-PPE compositions comprising boron compounds and polysiloxane compounds unexpectedly display flame retardant properties and good heat resistances. Moreover, the instant polyamide-PPE compositions do not contain halogens and red phosphorous.

SUMMARY OF THE INVENTION

Accordingly the invention is directed to novel polyamide-PPE compositions that unexpectedly display flame retardant properties and improved heat resistances, said composition comprising:

a) a blend comprising at least one polyamide and at least one polyphenylene ether;

b) at least one polymeric siloxane compound; and c) at least one boron compound.

In the instant invention, flame retardant properties mean that UL-94 is v-0 or V-1 at 1.6 mm and improved heat resistance mean a Vicat of greater than about 200° C., wherein the Vicat temperature the softening temperature at which a plastic starts to soften as specified according to ISO 306.

The present invention is based on the surprising discovery, that the use of a polymeric siloxane compound, preferably polysiloxane, in combination with boron compounds provides an improved flame retardant action in polyamide-polyphenylene ether blends. More in particular it is important that the negative influence of those compounds on the mechanical properties, such as impact resistance (IZOD) and heat resistance (Vicat) is relatively low, especially in comparison to the other environmentally friendly flame retardant additives.

DETAILED DESCRIPTION OF THE INVENTION

According to the present invention the polymer composition comprises as main components the PA-PPE blend, polysiloxane, at least one boron compound, and as optional components inorganic phosphate and titanium oxide. The use of organic based phosphorous compounds (such as organic phosphate and phosphine oxides) is not precluded in relation to the present invention, however, in view of their negative influence on the Vicat temperature they are not recommended.

The polyphenylene ethers employed in the instant invention are typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

Furthermore, polyphenylene ethers suitable for use in the practice of the present invention may be prepared by any of a number of processes utilizing precursor corresponding phenols or derivatives thereof. Examples for their production are disclosed in U.S. Pat. Nos. 3,306,874; 3,306,875; 3,257,357; 3,257,358; 3,337,501; and 3,787,361, all incorporated herein by reference.

Additional useful polyphenylene ethers are those which comprise molecules having at least one aminoalkyl-containing end group. The aminoalkyl radical is typically located in an ortho position to the hydroxygroup. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A proportion of the polymer molecules may contain at least one of said aminoalkyl-containing and 4-hydroxybiphenyl end groups.

The polyamides employed in the instant invention are obtained, for instance, by polymerizing a monoaminemonocarboxylic acid; or a lactam thereof having at least 2 carbon atoms between the amino and carboxylic acid group or by polymerizing substantially equimolar proportions of a diamine which contains at least 2 carbon atom amino groups and a dicarboxylic acid; or by polymerizing a monoaminocarboxylic acid or a lactam thereof as defined hereinabove together with substantially equimolar proportions of a diamine and a dicarboxylic acid. The dicarboxylic acid in the form of a functional derivative thereof; for example, an ester or acid chloride.

The term "substantially equimolecular" proportions (of the diamine and of the dicarboxylic acid) is used to cover both strict equimolecular proportions and slight departures therefrom which are involved in conventional techniques for stabilizing the viscosity of the resultant polyamides.

Examples of the aforementioned monoaminomonocarboxylic acids or lactams thereof which are useful in preparing the polyamides include those compounds containing from 2 to 16 carbon atoms between the amino and carboxylic acid groups, said carbon atoms forming a ring with the —CO—NH-group in the case of a lactam. As particular examples of aminocarboxylic acids and lactams there may be mentioned aminocaproic acid, butyrolactam, pivalolactam, caprolactam, capryl-lactam, enantholactam, undecanolactam, dodecanolactam and 3- and 4-aminobenzoic acids.

Diamines suitable for use in the preparation of the polyamides include straight chain and branched, alkyl, aryl and alkyl-aryl diamines. Such diamines include, for example, those represented by the general formula I

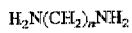

$$H_2N(CH_2)_nNH_2 \quad\quad\quad I$$

wherein n is an integer of from 2 to 16, such as trimethylene diamine, tetramethylene diamine, pentamethylene diamine, octamethylene diamine and especially hexamethylene diamine, as well as trimethyl hexamethylene diamine, meta-phenylene diamine, meta-xylene diamine and the like.

The dicarboxylic acids may be aromatic, for example, isophthalic and terephthalic acids. Preferred dicarboxylic acids are of the formula II

$$HOOC—Y—COOH \quad\quad\quad II$$

wherein Y represents a divalent aliphatic group containing at least 2 carbon atoms, and examples of such acids are sebacic acid, octadecanedoic acid, suberic acid, glutaric acid, pimelic acid and adipic acid.

Typical examples of polyamides (Nylons) useful in the instant polyamide compositions include for example polyamides 4/6, 6, 6/6, 11, 12, 6/3, 6/4, 6/10 and 6, 12 as well as polyamides resulting from terephthalic acid and/or isophthalic acid and trimethyl hexamethylene diamine, polyamides resulting from adipic acid and meta xylylene diamines, polyamides resulting from adipic acid, azelaic acid and 2,2-bis-p-aminocyclohexyl)propane, semi-crystalline polyamides resulting from combinations of terephthalic and/or isophthalic and/or adipic acids with hexamethylene diamine, semi-crystalline polyamides resulting from terephthalic and/or isophthalic acids and hexamethylene and 2-methyl pentamethylene diamines, and polyamides resulting from terephthalic acid and 4,4'-diaminodicyclohexylmethane. Mixtures and/or copolymers of two or more of the foregoing polyamides or prepolymers, respectively, are also within the scope of the present invention. Preferred polyamides are the polyamides 6, 6/6, 6/10 and 4/6, most preferably polyamide 6/6.

It is also understood that use of the term "polyamides" herein and in the appended claims is intended to include the toughened or super tough polyamides. Super tough polyamides or super tough nylons, as they are more commonly known, are available commercially, e.g., from E. I. dupont under the tradename Zytel ST, or may be prepared in accordance with a number of U.S. patents, including, among others, Epstein, U.S. Pat. No. 4,174,358; Novak U.S. Pat. No. 4,474,927; Roura, U.S. Pat. No. 4,346,194; and Joffrion, U.S. Pat. No. 4,251,644, herein incorporated by reference. These super tough nylons are prepared by blending one or more polyamides with one or more polymeric or copolymeric elastomeric toughening agents. Suitable toughening agents are disclosed in the above-identified U.S. patents, as well as in Caywood, Jr., U.S. Pat. No. 3,884,882 and Swiger, U.S. Pat. No. 4,147,740 and Gallucci et al., "Preparation and Reactions of Epoxy-Modified Polyethylene", J. Appl. Poly., Sci., Vol. 27, pp. 425–437 (1982) herein incorporated by reference. Typically, these elastomeric polymers and copolymers may be straight chain or branched as well as graft polymers and copolymers, including core-shell graft copolymers, and are characterized as having incorporated therein either by copolymerization or by grafting on the performed polymer, a monomer having functional and/or active or highly polar groupings capable of interacting with or adhering to the polyamide matrix so as to enhance the toughness of the polyamide polymer.

While it is preferred that the polyamide compositions of the instant invention comprise blend of polyamides and polyphenylene ethers, it is also within the scope of this invention to include in said compositions acrylic polymers including polymethylmethacrylate, acrylonitrile styrene copolymers, styrene-acrylonitrile-butadiene copolymers, polyvinyl chloride, polystyrene, butyrates, polyaliphatics, polycarbonates and polyesters, cellulosic, phenolic, amino and epoxy resins.

It is also within the scope of the instant invention to employ compatibilization agents in the blends. Such compatibilization agents include, for instance, compounds selected from the group consisting of tetracarboxylic acids of aromatic and aliphatic compounds, alicyclic compounds, dianhydride derivatives and halogen substituted phthalic anhydrides. A more detailed description of blend compatibilization may be found in U.S. Pat. No. 4,826,933, the disclosure of which is incorporated herein by reference.

The blending ratio of polyamide to polyphenylene ether units is about 5 to about 95% by weight, preferably about 10 to about 70% by weight of polyphenylene ether to about 90 to about 30% by weight of polyamide.

Impact modifiers for polyphenylene ether-polyamide blends are well known in the art. They are typically derived from one or more monomers selected from the group consisting of olefins, vinyl aromatic monomers, acrylic and alkylacrylic acids and their ester derivatives as well as conjugated dienes. Especially preferred impact modifiers are the rubbery high-molecular weight materials including natural and synthetic polymeric materials showing elasticity at room temperature. They include both homopolymers and copolymers, including random, block, radial block, graft and core-shell copolymers as well as combinations thereof.

A particularly useful class of impact modifiers comprises the AB (diblock) and ABA (triblock) copolymers and core-shell graft copolymers of alkenylaromatic and diene compounds, especially those comprising styrene and butadiene or isoprene blocks. The conjugated diene blocks may be partially or entirely hydrogenated, whereupon they may be represented as ethylene-propylene blocks or the like and have properties similar to those of olefin block copolymers. Examples of triblock copolymers of this type are polystyrene-polybutadiene-polystyrene (SBS), hydrogenated polystyrene-polybutadiene-polystyrene (SEBS), polystyrene-polyisoprene-polystyrene (SIS), poly(a-methylstyrene)-polybutadiene-poly(a-methylstyrene) and poly(a-methylstyrene)-polyisoprene-poly(a-methylstyrene). Particularly preferred triblock copolymers are available commercially as CARIFLEX®, KRATON D® and KRATON G® from Shell.

Also suitable as impact modifiers are the ionomer resins, which may be wholly or partially neutralized with metal ions, and the core-shell type graft copolymers. In general, the latter have a predominantly conjugated diene or crosslinked acrylate rubbery core and one or more shells polymerized thereon and derived from monoalkenylaromatic and/or acrylic monomers alone or in combination with other vinyl monomers. Included are copolymers wherein an interpenetrating network of the resins employed characterizes the interface between the core and shell, such as those available from General Electric Company and described in U.S. Pat. No. 3,944,631.

Other impact modifiers include the above-described types containing units having polar groups or active functional groups, as well as miscellaneous polymers such as Thiokol rubber, polysulfide rubber, polyurethane rubber polyether rubber (e.g., polypropylene oxide), epichlorohydrin rubber, ethylene-propylene rubber, thermoplastic polyester elastomers and thermoplastic ether-ester elastomers.

Additionally, the polyamide and polyphenylene ether blends may further comprise, for instance, functionalized polyphenylene ethers, polycarboxylic acids, ester groups, epoxy groups, anhydride groups, rubbers or any other conventional moiety employed to improve the properties of the blend.

The polymeric siloxane compound used in the present invention may be selected from the group of polysiloxane and siloxane copolymers, such as polyphenylene ether or polyetherimide siloxane copolymers. The preferred polysiloxane compounds employed in the instant invention are commercially available and are represented by the formula IV aminoalkyl)-3-aminoalkyl group, provided that $R^2$ is a $C_{1-5}$ alkyl group when w is 1 and a N-(2-aminoalkyl)-3-aminoalkyl group when w is 0. It is often preferred that $R^2$ is a methyl group or a N-(2-aminoethyl)-3-aminopropyl group. $R^3$ is hydrogen or a $C_{1-5}$ alkyl group, preferably a methyl group. W is 0 or 1 and x and y are each independently an integer from 1 to 7 and z is an integer from 0 to 7. It is noted herein that any combination of compounds represented by formula IV may be employed.

It is also within the scope of the invention to employ polysiloxanes represented by the formulae V and VI

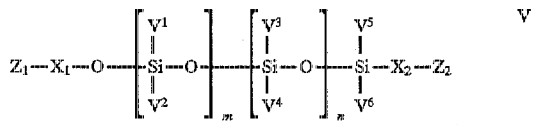

and

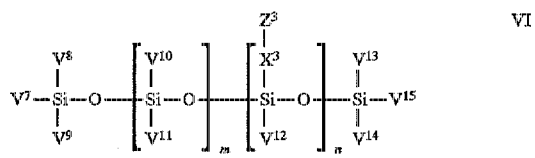

wherein m+n has a value of 5–2000, $V^1$–$V^{15}$, each independently of each other, represent a hydrogen atom or one of the following groups having 1–12 carbon atoms: alkyl, alkoxy, alkenyl, aryl, aralkyl, alkylaryl, which groups may be halogenated; wherein $X_1$, $X_2$, $X_3$, each independently of each other, represent one of the following groups; alkylene, cycloalkylene, arylene, aralkylene, alkylarylene; wherein $Z_1$, $Z_2$, $Z_3$, each represent one of the following groups: $-NV^{16}V^{17}$, $-NH-(CH_2)_q-NV^{16}V^{17}$ in which $V^{16}$ and $V^{17}$, each independently of each other, represent a hydrogen atom or an alkyl group having 1–12 carbon atoms, q has a value from 1–10, an aliphatic or cycloaliphatic epoxide, a carboxylic acid or anhydride group, $Z_1$ or $Z_2$ is a hydrogen atom, in which, however, the compound of formula V may not comprise simultaneously an amine group and an epoxide group or not simultaneously an amino group and a carboxylic acid group, or not simultaneously an epoxide group, and a carboxylic acid or anhydride group.

One of the important components of the present invention is the boron compound. Within the scope of the present invention organic and inorganic boron compounds may be used, the amount of the compounds being such that the boron content of the polymer composition, calculated as atomic boron, is between 0.02 and 5, preferably between 0.2 and 1 wt. %.

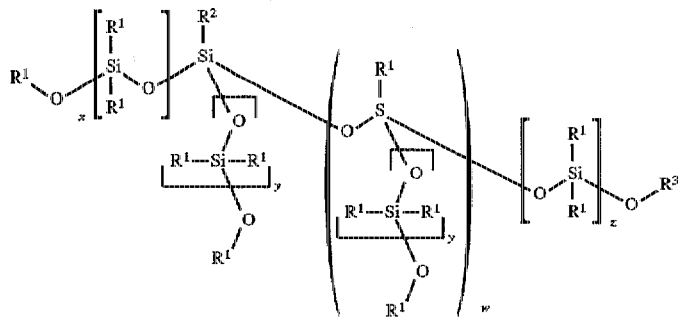

wherein each $R^1$ is independently a $C_{1-5}$ alkyl group and preferably a methyl group and $R^2$ is a $C_{1-5}$ alkyl group or a primary or secondary amino group such as a N-(2-

Suitable boron compounds are i.a. boric acid, metal borates, boron phosphate, perborates and the like. More in particular preferred are metal borates (and perborates), such alkali metal borate (sodium, potassium etc), alkaline earth borates (calcium, barium and magnesium) and transition metal borates, such as zinc borate. Those metal borates, but also the metal perborates, are preferably used in the anhydrous form.

According to the invention the composition additionally may contain inorganic phosphates and/or titanium oxide. Examples of suitable inorganic phosphates are the alkali metal (including ammonium) phosphates, alkali metal hydrogen phosphates, alkali metal pyrophospates and the like. In a specifically preferred embodiment the boron compound and the inorganic phosphate may be combined in boron phosphate, which gives a clearly improved flame retardant action. Also the use of titaniumoxide improves the properties of the polymer composition.

As the use of calcium sulphate has been found to improve the comparative tracking index, the use thereof in the compositions of the invention, preferably in amounts between 5 and 20 wt. % of the composition is preferred.

The amounts of both the phosphate compound and the titanium oxide may be selected within wide ranges, each being preferably between 0.1 and 20wt. % of the total of the polymer composition.

It is also noted herein that the polyamide compositions of this invention may also contain conventional ingredients such as fillers, additional flame retardants (such as tripiperidine phosphine oxide and magnesium or aluminum hydroxide), pigments, dyes, stabilizers, anti-static agents, crystallization aids, mold release agents and the like, as well as resinous components not previously discussed.

Other additives that may be employed to enhance flame retardancy in the instant invention include phosphine oxides, such as triarylphosphine oxides and aromatic phosphates, especially diphosphates. Illustrative examples of triarylphosphine oxides include triphenylphosphine oxide, tritolylphosphine oxide, trinonylphosphine oxide and trinaphtylphosphine oxide. Triphenylphosphine oxide is often preferred. The aromatic diphosphates that may be employed in this invention have the formula VII

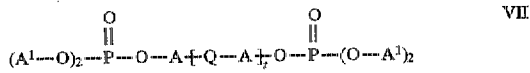

VII wherein each A and $A^1$ are independently a substituted or unsubstituted aliphatic, alicyclic or aromatic radical and Q is a covalent bond linking a carbon in each A or a bridging radical selected from the group consisting of $CH_2$, $C(CH_3)_2$, S, $SO_2$, CO,O and N=N and t is an integer from 0 to 4. A suitable example of an aromatic monophosphate is triphenylphosphate.

Additional additives that may be employed in the instant invention to enhance flame retardancy include melamine cyanurate and aluminium and magnesium hydroxide. Fillers such as mineral fillers may be added, such as calcium or barium sulphate.

The method for producing the blends employed in the present invention is not particularly limited, and the conventional methods are satisfactorily employed. Generally, however, melt blending methods are desirable. The time and temperature required for melt-blending are not particularly limited, and they can properly be determined according to the composition of the material. The temperature varies somewhat with the blending ratio of the polyphenylene ether to polyamide, but it is generally within a range of 270° to 350° C. A prolonged time and/or a high shear rate is desirable for mixing, but the deterioration of the resin composition advances. Consequently, the time needs to be determined taking into account these points.

Any of the melt-blending methods may be used, if it can handle a molten viscous mass. The method may be applied in either a batchwise form or a continuous form. Specifically, extruders, Banbury mixers, rollers, kneaders and the like may be employed.

The following examples illustrate the production and properties of the flame retardant polyamide/polyphenylene ether compositions of the instant invention.

Examples

A number of blends were prepared by tumble mixing a precompounded blend of polyphenylene ether and polyamide (PA) 66, with various additives, followed by extrusion at 290° C. and granulation. The granules were heated to 300° C. and molded into 1.6 mm UL test bars.

The silicone oil used in the examples consists of a blend of four polymers corresponding to formula IV in the description (2 parts: w=0; x, y, z=5; $R^1$=methyl, $R^2$=N-2-(aminoethyl)-3-aminopropyl; $R^3$=methyl, 3 parts: w=0; x, y, z=5; $R^1$, $R^2$=methyl; $R^3$=methyl, 2 parts: w=0; z=0; x=5, y=5; $R^1$, $R^2$=methyl; $R^3$=H; 1 part: w=1; x, y, z=5; $R^1$, $R^2$=methyl; $R^3$=methyl)

Examples 14 and 15 are based on precompounded PA-6 blends. Examples 16 and 17 were prepared from a precompounded PPE/PA blend, and separately added PA.

In the following tables the composition (in parts by weight) and the properties of the blends have been compiled.

| Composition | 1 | 2 | 3 | 4 | 5 | 6 | 7 | 8 | 9 | 10 |
|---|---|---|---|---|---|---|---|---|---|---|
| PPE/PA (50/50) | 100 | 95 | 98 | 93 | 89.5 | 89.5 | 89.5 | 89.5 | 89.5 | 89.5 |
| Silicone oil | — | — | — | 2 | 2 | 2 | 2 | 2 | 2 | 2 |
| Zinc borate (anhydrous) | — | — | — | — | 8.5 | 3 | 3 | 3 | 3 | 3 |
| Boron phosphate | — | 5 | — | 5 | — | — | — | — | — | — |
| Aluminium metaphosphate | — | — | — | — | — | 8.5 | — | — | — | — |
| Calcium pyrophosphate | — | — | — | — | — | — | 5.5 | — | — | — |
| Trilithium phosphate | — | — | — | — | — | — | — | 5.5 | — | — |
| Magnesium metaphosphate | — | — | — | — | — | — | — | — | 5.5 | — |
| Zinc pyrophosphate | — | — | — | — | — | — | — | — | — | 5.5 |
| Vicat °C. | 222 | 221 | 217 | 218 | 216 | 218 | 219 | 217 | 219 | 219 |
| UL-class | HB (drip) | HB (drip) | HB (drip) | V0 | V1 | V0 | V1 | V1 | V1 | V1 |
| Izod/notched (kJ/m²) | 5.5 | 4.2 | 7.5 | 6.4 | 6.7 | 6.0 | 5.3 | 6.9 | 5.8 | 5.3 |

-continued

| Composition | Example | | | | | | |
|---|---|---|---|---|---|---|---|
| | 11 | 12 | 13 | 14* | 15* | 16 | 17 |
| PPE/PA (60/40) | 93 | — | — | — | — | — | — |
| PPE/PA (50/50) | — | 84.49 | 86.49 | 78 | 73 | 32 | 32 |
| PA | — | — | — | — | — | 51 | 41 |
| Silicone oil | 2 | 2 | — | 2 | 2 | 2 | 2 |
| Boron phosphate | 5 | — | — | 5 | 5 | 10 | 10 |
| Aluminium metaphosphate | — | 5.5 | 5.5 | — | — | — | — |
| Zinc borate | — | 3 | 3 | — | — | — | — |
| $TiO_2$ | — | 5 | 5 | — | 5 | 5 | 5 |
| Carbon black | — | 0.01 | 0.01 | — | — | — | — |
| Calcium sulfate | — | — | — | 15 | 15 | — | 10 |
| Vicat °C. | 213 | — | — | 204 | 205 | 212 | 230 |
| UL-class | V1 | V0 | HB | V2 | V1 | V2 | V2 |
| Izod/notched (kJ/m²) | 4.9 | 4.2 | 4.3 | 3.7 | 3.3 | 2.8 | 2.5 |
| CTI (V) | — | — | — | 450 | 550 | 350 | 450 |

*: PA 6 based

I claim:

1. A composition comprising:

a) a blend comprising at least one polyamide and at least one polyphenylene ether;

b) at least one polymeric siloxane compound represented by the formula:

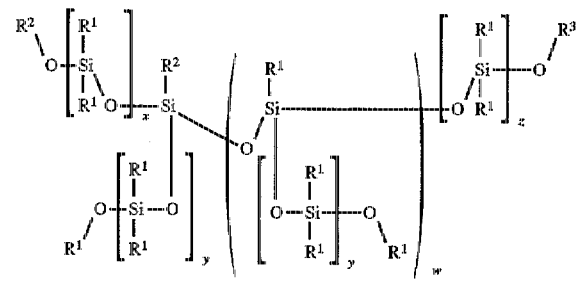

wherein each $R^1$ is independently a $C_{1-5}$ alkyl group, $R^2$ is a $C_{1-5}$ alkyl group or a primary or secondary amino group, provided that $R^2$ is a $C_{1-5}$ alkyl group when w is 1 and a N-(2-aminoalkyl)-3-aminoalkyl group when w is 0, $R^3$ is hydrogen or a $C_{1-5}$ alkyl group, w is 0 or 1 and x and y are each independently an integer from 1 to 7 and z is an integer from 0 to 7; and c) at least one boron compound.

2. The polymer composition according to claim 1, wherein the boron compound is selected from the group consisting of metal borates, boric acid, organic boron compounds, perborates, boron phosphate and mixtures of two or more of these boron compounds.

3. The polymer composition according to claim 2, wherein the boron compound is zinc borate, boron phosphate, or mixtures of zinc borate and boron phosphate.

4. The polymer composition according to claim 1, wherein additionally at least one inorganic phosphate compound d) is present.

5. The polymer composition according to claim 1, wherein the amount of polyphenylene ether in the polyamide-polyphenylene ether blend is not more than 95 wt. %.

6. The polymer composition according to claim 5, wherein the amount of polyphenylene ether in the polyamide-polyphenylene ether blend is between 10 and 70 wt. %.

7. The polymer composition according to claim 5, wherein the amount of polymeric siloxane compound is between 0.1 and 20.

8. The polymer composition according to claim 7, wherein the amount of boron compound, calculated as atomic boron, is between 0.02 and 5 wt. %.

9. The polymer composition according to claim 7, wherein the amount of polymeric siloxane compound is between 1 and 5 wt. % of the composition.

10. The polymer composition according to claim 1, wherein the composition additionally contains as component e) titaniumoxide, or as component f) calcium sulphate or a combination of both.

11. The polymer composition of claim 1 wherein the amounts of components (a), (b), and (c) are sufficient to provide a composition with a UL-94 V-2 rating or better at 1.6 mm.

12. The polymer composition of claim 1 wherein the amounts of components (a), (b), and (c) are sufficient to provide a composition with a UL-94 V-1 rating or better at 1.6 mm.

13. The polymer composition of claim 1 wherein the amounts of components (a), (b), and (c) are sufficient to provide a composition with a UL-94 V-0 rating at 1.6 mm.

14. The polymer composition of claim 1 further comprising compatibilization agents.

15. The polymer composition of claim 14 further comprising impact modifiers.

16. A composition consisting essentially of:

a) a blend consisting essentially of at least one polyamide and at least one polyphenylene ether;

b) at least one polymeric siloxane compound represented by the formula:

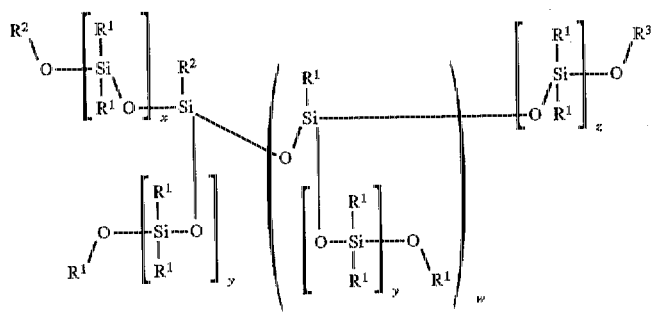

wherein each $R^1$ is independently a $C_{1-5}$ alkyl group, $R^2$ is a $C_{1-5}$ alkyl group or a primary or secondary amino group, provided that $R^2$ is a $C_{1-5}$ alkyl group when w is 1 and a N-(2-aminoalkyl)-3-aminoalkyl group when w is 0, $R^3$ is hydrogen or a $C_{1-5}$ alkyl group, w is 0 or 1 and x and y are each independently an integer from 1 to 7 and z is an integer from 0 to 7; and c) at least one boron compound.

17. The polymer composition of claim 16 additionally consisting essentially of at least one member of the group consisting of an inorganic phosphate compound; titanium oxide; calcium sulfate; and a combination of titanium oxide and calcium sulfate.

* * * * *